(No Model.) 2 Sheets—Sheet 1.

F. J. PATTEN.
SYSTEM OF SYNCHRONIZING ELECTRIC MOTORS.

No. 398,794. Patented Feb. 26, 1889.

WITNESSES: INVENTOR.

UNITED STATES PATENT OFFICE.

FRANCIS JARVIS PATTEN, OF NEW YORK, N. Y., ASSIGNOR TO J. M. SEYMOUR, OF SAME PLACE.

SYSTEM OF SYNCHRONIZING ELECTRIC MOTORS.

SPECIFICATION forming part of Letters Patent No. 398,794, dated February 26, 1889.

Application filed August 1, 1888. Serial No. 281,701. (No model.)

*To all whom it may concern:*

Be it known that I, FRANCIS JARVIS PATTEN, a citizen of the United States, residing at New York city, in the county of New York and State of New York, have invented certain new and useful Improvements in Electric Motors, of which the following is a description.

My invention relates to a system for synchronizing electric motors, and comprises a system operative at two or more distant stations connected with each other in a single circuit. In a former application, No. 275,787, I have described a somewhat similar device. The present system is a different and a more elaborate application of similar apparatus, based, however, upon the same principles as the device formerly shown.

The invention embodies features which will hereinafter be fully described, and definitely indicated in the accompanying claims.

Figure 1:
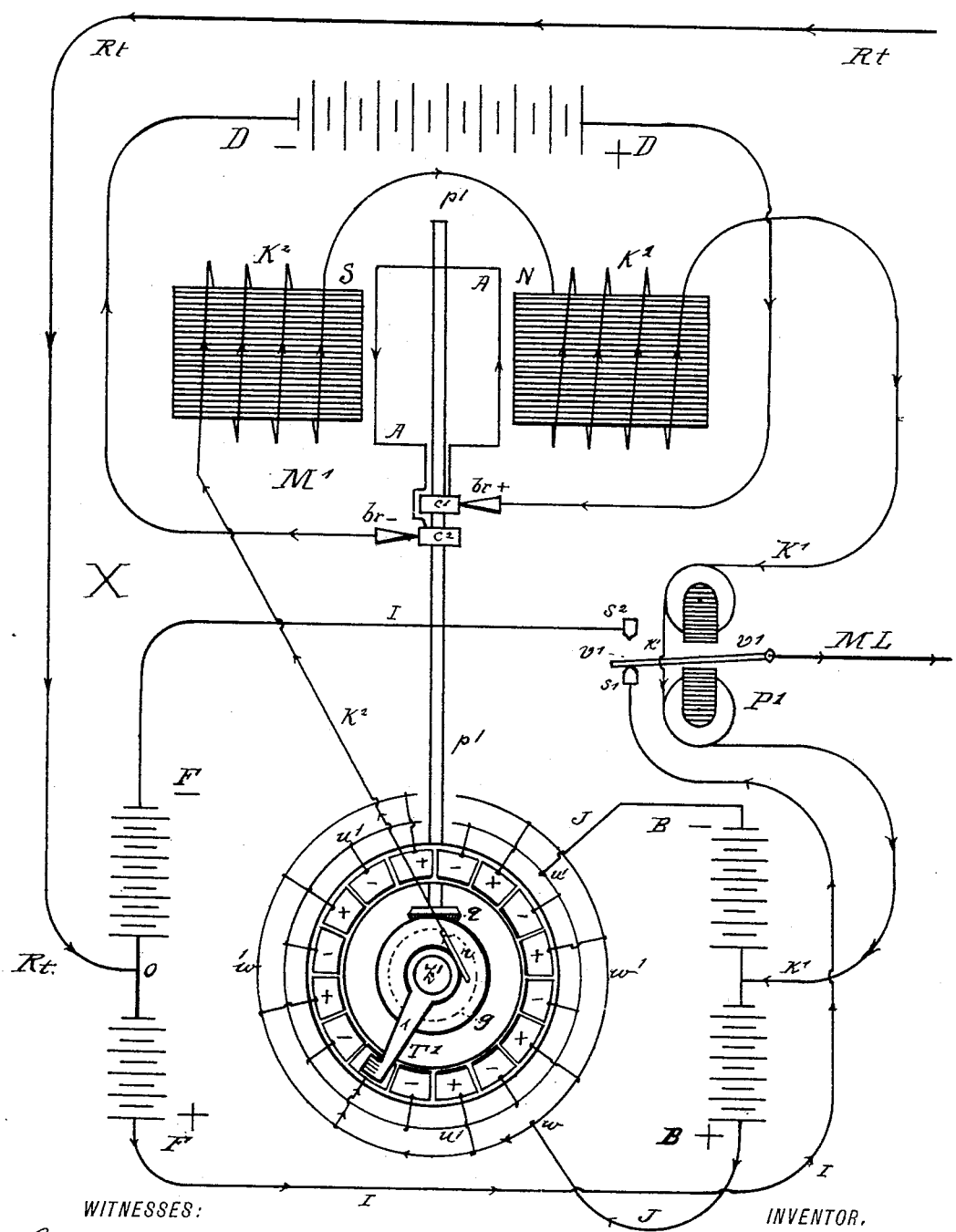
Figure 2:
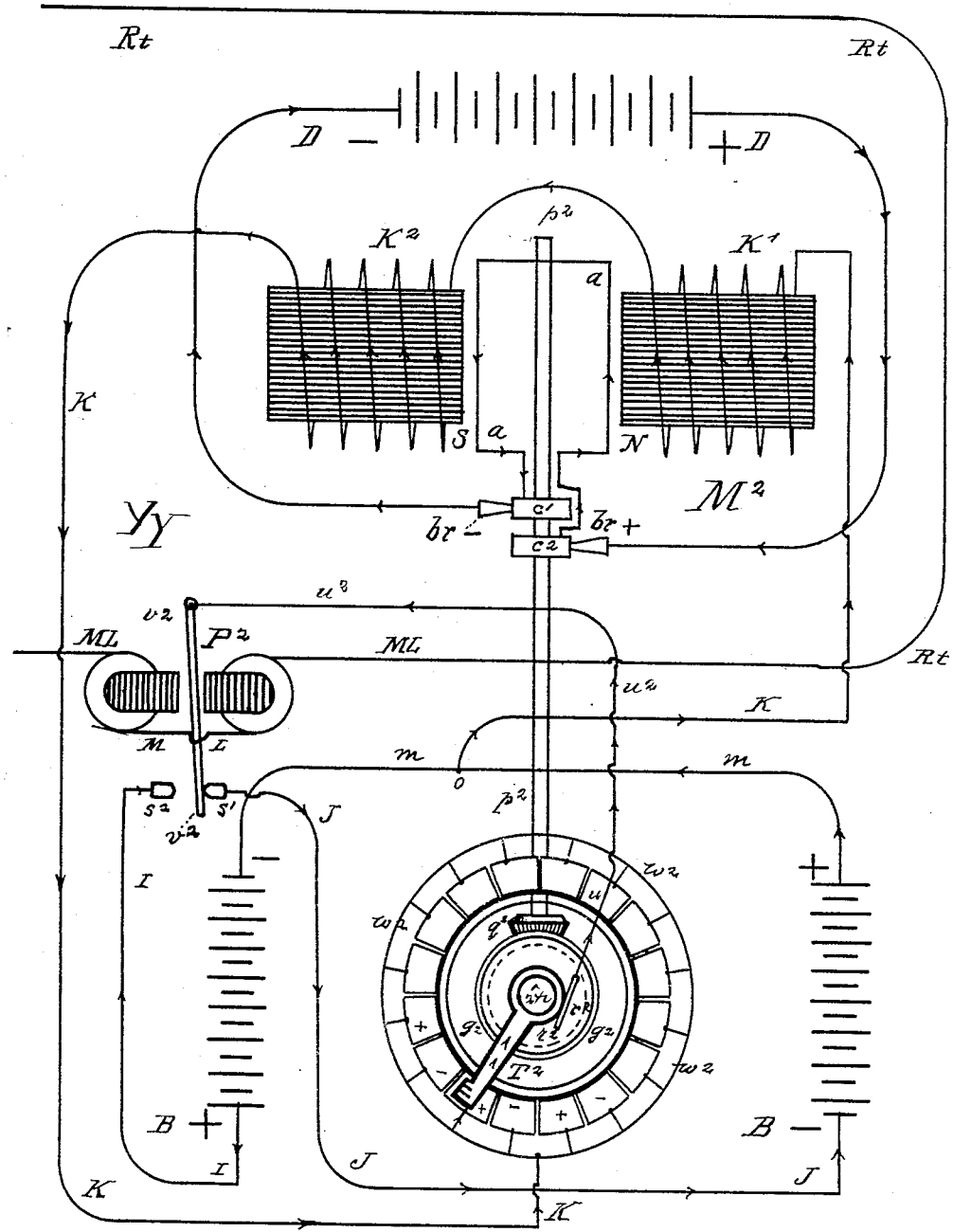

In the drawings, Figure 1 represents by diagram the apparatus and connections in circuit at one station, and Fig. 2 shows the apparatus at a distant station where it is desired another motor shall run in synchronism with the first. The two figures taken together show a complete system at the two stations X and Y connected in a single closed circuit formed by the main line M L, joining the two stations and the return R$t$.

At the station X, Fig. 1, is a peculiar form of electric motor, M'. Its armature A A is connected through the insulated ring-contacts $c'$ and $c^2$ and brushes $br+$ and $br-$, bearing thereon, to a source of direct current D+ D—, and the armature is thus supplied with a continuous current in one direction. In order that this armature so supplied shall turn or rotate continuously in the magnetic field, it is an essential condition that the field-poles N and S shall be reversed or alternated at each half-revolution of the armature A A, and this is accomplished by the operation of an external fixed commutator and a revolving brush driven by the armature of the machine as it revolves. The armature-spindle $p'$ $p'$ is geared, as shown, to another spindle, $z'$, at right angles to it, and this spindle carries a revolving trailing brush, T', which sweeps over the table of insulated segments + — + —, &c.

The gearing between the two spindles is so proportioned that a half-revolution of the armature about its own axis drives the trailer T' over precisely one segment of the fixed commutator. The trailing brush T' is included in the field-circuit of the motor M', one terminal of this circuit being connected to the rubbing-contact $r$ and the other to the middle point of the split battery B+ B—, and one pole of this battery is connected through the wire $u'$ $u'$ to all the — (minus) segments of the fixed commutator, and the other pole, through a similar wire, $w'$ $w'$, is connected to all the + (plus) segments, from which it follows that as the trailer T' passes from one segment to the next the current in the field-coils and the poles of the field will be reversed and the armature will continue to revolve, the field-magnetism being reversed at each half-revolution of the armature. This circuit, which energizes the field by an alternating current, is led by an external loop, K' K', through the coils of the polarized relay P'. As the armature A A revolves, alternate currents are sent through the field-coils K' and K$^2$, and also through the polarized relay P' in circuit with them, and the armature $v'$ of this relay will vibrate between the two contact-stops $s'$ and $s^2$, beating the half-revolutions of the armature A A. These stops are connected to the opposite poles F+ and F— of an independent line-battery split at its middle point, $o$, where the return-circuit R$t$, joining the two stations, is connected. The fixed point line M L, extending direct from station X to the vibrator $v'$ is connected to the main Y, and therefore, as the armature of the relay vibrates, currents of reversed polarity will be sent through the line-circuit M L and R$t$, connecting the two stations.

It follows, from the connections described, that the armature A A will perform a half-revolution at each reversal of current in the field-coils, and as this takes place whenever the trailer T' passes from one segment of the distributer to the next the vibrating armature $v'$ of the polarized relay P' will not only beat the half-revolutions of the armature A A of the motor M', but it will be reversed each time the trailer T' passes from one segment of the distributer to the next, and the vibrator will transmit through the circuit M L R$t$ alternating pulsations of current for each successive segment traversed by the trailer T'.

At the distant station Y, Fig. 2, the main connecting-circuit M L R$t$ traverses the polarized relay P$^2$ and causes its armature $v^2$ to vibrate at each reversal of current sent by the vibrating armature $v'$ at station X over the line. The fixed point of the vibrator $v^2$ at Y is connected through the lead $u^2$ to a rubbing-contact, $r^2$, and through it to the trailer T$^2$, which is geared to the motor M$^2$ at station Y and sweeps over the segments $+$ $-$ of its distributer in unison with the trailer T' at station X, as will be explained. All the segments $+$ $-$, &c., at station Y are connected to a common wire, $w^2$, encircling them all, and this is connected through the lead K K to the field-magnet coils K$^2$ and K' of the motor M$^2$, and thence back to the middle point, $o$, of the split battery B$+$ B$-$, Fig. 2, the other terminals of which are connected through the leads J J and I I to the contact-stops $s'$ and $s^2$, against which the vibrating armature $v^2$ makes contact at each vibration. The field-coils K' and K$^2$ receive, therefore, currents of reversed direction as their circuit is closed by the armature $v^2$ of the polarized relay P$^2$ through the stop $s'$ or $s^2$. This circuit, however, can only be completed through that particular division $+$ or $-$ of the segmental distributer with which the trailer T$^2$ is in contact. These segments, forming a part of the complete field-circuit K' K' K$^2$ $o$, become, therefore, alternately plus and minus connections as the vibrator $v'$ at the remote station X makes contact first with one stop and then with the other; but the movements of the vibrator $v^2$ at Y must correspond to those of the armature $v'$ at X, and the polarized relay P$^2$ at station Y beats the half-revolutions of the motor-armature A A at X, as well as its own armature $a$ $a$, for in so doing it alternates the field N S of the motor M$^2$, and at same time makes the distributer-segment upon which the trailer T$^2$ rests a plus or minus connection to complete the field-circuit for this machine. The armature $a$ $a$ and the trailer T$^2$ will therefore revolve in perfect synchronism with the armature A A and the trailer T' at station X.

The machine M$^2$ at the station Y has, like that at X, a single-coil armature, the terminals of which are led to two continuous ring-contacts, $c'$ and $c^2$, through which and the brushes $br+$ and $br-$ it receives a continuous direct current from the source D$+$ and D$-$. The spindle of this armature, like the other, is geared to another spindle Z, through the wheels $q^2$ and $g^2$, in such a way that the trailer T$^2$ passes over precisely one segment while the armature makes one-half a revolution.

Having thus described my invention, what I claim, and desire to secure by Letters Patent, is the following:

1. The system described for producing the synchronous movement of electric motors at distant points, comprising a main-line circuit connecting said points, electric motors at said points having their armatures and field-coils connected in separate independent circuits, one to a source of direct and the other to a source of alternating current, the supply of current in said alternating circuit being controlled by said main-line circuit and by polarized relays or vibrators included in said line-circuit.

2. A device for producing the synchronous rotation of electric motors at distant points, comprising an electric motor at one point having its field-coils connected through a polarized relay or vibrator and a revolving trailing brush driven by the armature of said motor to the parts of a fixed reversing-commutator, the alternate segments of which are connected to sources of current of opposite polarity, the armature-coils of said motor being connected in a continuous direct-current circuit, the reversals of current in said field-coils corresponding to the passage of the revolving trailing brush from one segment of the fixed commutator to the next and to the half-revolutions of the armature to which it is geared, the main-line circuit being connected to the fixed end of the vibrating armature of said polarized relay and through the latter and its contact-stops and the return-circuit to a separate source of alternate currents as the armature of said polarized relay vibrates.

3. A device for producing the synchronous rotation of electric motors, comprising an electric motor at one point having its field-coils connected through a polarized relay to a source of alternate currents, the armature of said polarized relay being connected to a main-line circuit extending to one or more distant points, the said main-line circuit connected in series to the coils of other polarized relays or vibrators, the armatures of which are connected through their contact-stops and sources of alternate currents connected thereto to the field-coils of the electric motors at said points, whereby the alternations of current in the said field-coils of the distant electric motors are made to correspond in period to the vibrations of the armatures of said polarized relays.

4. In an apparatus for producing synchronous movements at different distant points, electric motors at said points having their armature and field circuits separately connected, one to a source of continuous direct current and the other through the vibrating armature and contact-stops of a polarized relay or vibrator and a fixed contact-brush and revolving trailer to the parts of a fixed reversing-commutator, the segments of which are connected by the vibrating armature of said polarized relay or vibrator to sources of current of opposite polarity, whereby the current in the alternating circuit of said motors is reversed at each vibration of said armature and at each passage of the revolving trailing brush from one segment of the fixed reversing-commutator to the next.

5. In a system for synchronizing electric motors, the combination of a governing-motor at one station, a current-reverser driven by the moving part of said motor, each reversal of current corresponding to a half-revolution of said moving part, a line-circuit traversed by reverse currents corresponding to the reversals produced by the current-reverser, a series of relays at distant stations operated by the line-currents, and a series of governed or driven motors at the distant stations, one magnetic element of each of which is excited by current of constant direction, and the other magnetic element of which is excited by reversed currents controlled by the relays.

In witness whereof I have hereunto signed my name in the presence of two subscribing witnesses.

FRANCIS JARVIS PATTEN.

Witnesses:
HERBERT TELL,
H. RICE.